US006557534B2

(12) United States Patent
Robichaux et al.

(10) Patent No.: US 6,557,534 B2
(45) Date of Patent: May 6, 2003

(54) CANISTER PURGE STRATEGY FOR A HYBRID ELECTRIC VEHICLE

(75) Inventors: Jerry D. Robichaux, Tucson, AZ (US); Stephen John Kotre, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/753,388

(22) Filed: Jan. 3, 2001

(65) Prior Publication Data

US 2002/0083930 A1 Jul. 4, 2002

(51) Int. Cl.⁷ .............................................. F02M 33/02
(52) U.S. Cl. ................................... 123/520; 123/179.16
(58) Field of Search ................................. 123/518, 519, 123/520, 179.16

(56) References Cited

U.S. PATENT DOCUMENTS

| 5,343,970 A | | 9/1994 | Severinsky |
| 5,371,412 A | | 12/1994 | Iwashita et al. |
| 5,751,137 A | * | 5/1998 | Kiuchi et al. .................. 322/14 |
| 5,962,927 A | * | 10/1999 | Inada et al. ............... 290/40 R |
| 6,382,191 B1 | * | 5/2002 | Curran et al. ................ 123/520 |

* cited by examiner

Primary Examiner—Thomas N. Moulis
(74) Attorney, Agent, or Firm—Carlos L. Hanze

(57) ABSTRACT

The present invention provides a method and system for purging a vapor canister in a Hybrid Electric Vehicle during vehicle idle conditions. The present invention first determines whether purging is necessary by measuring fuel tank pressure and the time since the last purge. If either of these elements exceeds a calibratable threshold, the controller determines that the engine needs to be on and that purging must occur. An electronic throttle controller can also be used to command the throttle plate to low positions to increase intake manifold vacuum while purging. This allows for very rapid ingestion of the fuel vapor without risk of engine stalls, if used in an HEV where the engine speed is controlled by an electric motor. Upon completion of the purging process, the engine is shut "off" and the vehicle is returned to its normal idle conditions.

21 Claims, 3 Drawing Sheets

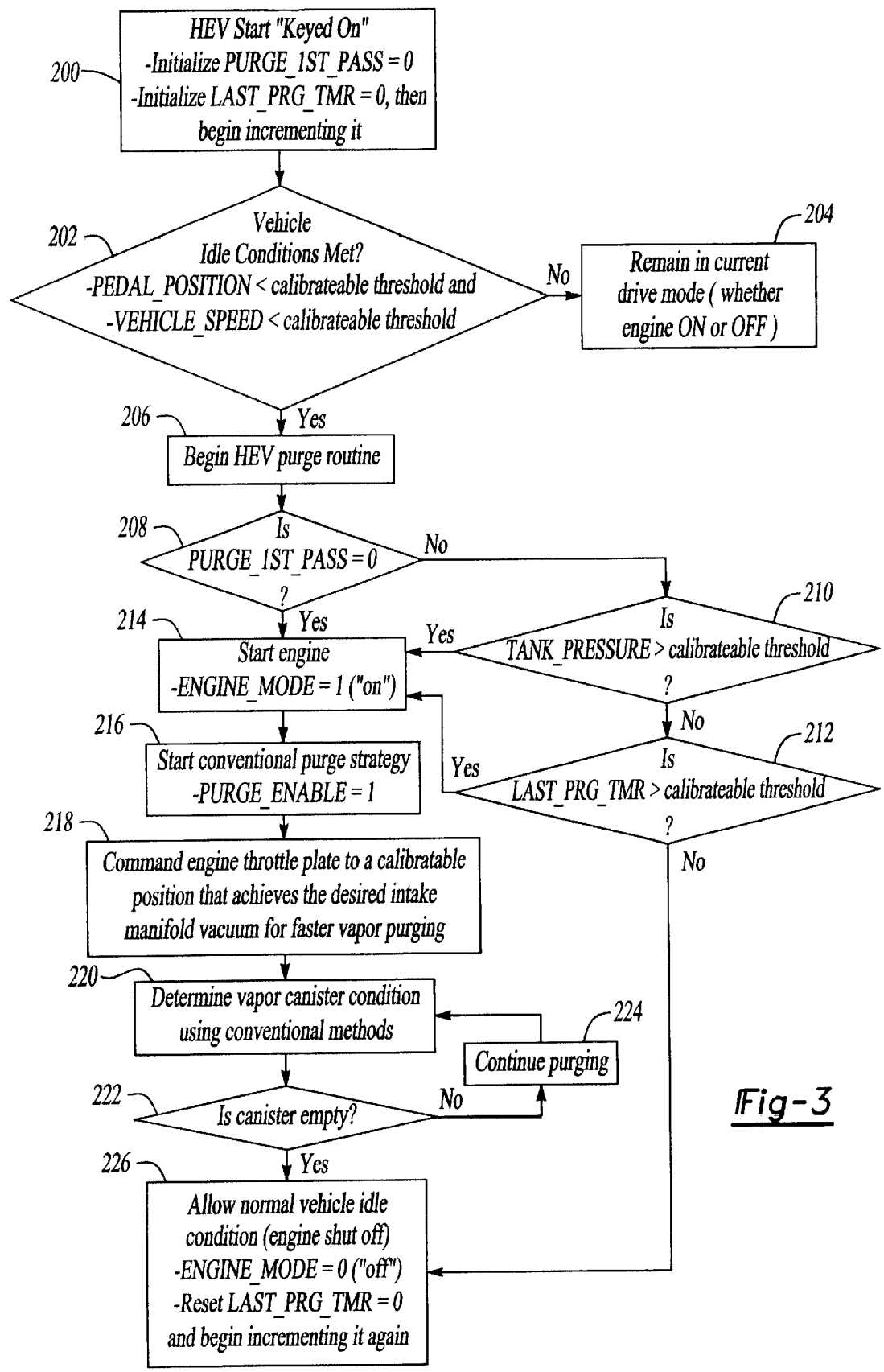

CANISTER PURGE STRATEGY FOR A HYBRID ELECTRIC VEHICLE

BACKGROUND OF THE INVENTION

1. Field of Invention

The present invention relates to a Hybrid Electric Vehicle ("HEV") where a vehicle system controller or engine controller determines if a canister collecting fuel vapor needs to be purged during vehicle idle.

2. Discussion of the Prior Art

The need to reduce fossil fuel consumption and pollutants of automobiles and other vehicles powered by Internal Combustion Engines ("ICEs") is well known. Vehicles powered by electric motors have attempted to address these needs. However, electric vehicles have limited range and limited power coupled with the substantial time needed to recharge their batteries. An alternative solution is to combine both an ICE and electric traction motor into one vehicle. Such vehicles are typically called Hybrid Electric Vehicles ("HEVs"). See generally, U.S. Pat. No. 5,343,970 (Severinsky).

The HEV has been described in a variety of configurations. Many HEV patents disclose systems where an operator is required to select between electric and internal combustion operation. In others, the electric motor drives one set of wheels and the ICE drives a different set.

Other configurations have developed. A Series Hybrid Electric Vehicle ("SHEV") is a vehicle with an engine (most typically an ICE) which powers a generator. The generator, in turn, provides electricity for a battery and motor coupled to the drive wheels of the vehicle. There is no mechanical connection between the engine and the drive wheels. A Parallel Hybrid Electrical Vehicle ("PHEV") is a vehicle with an engine (most typically an ICE), battery, and electric motor combined to provide torque to power the wheels of the vehicle.

A Parallel/Series Hybrid Electric Vehicle ("PSHEV") has characteristics of both a PHEV and a SHEV. The PSHEV is also known as a torque (or power) splitting powertrain configuration. Here, the torque output of the engine is given in part to the drive wheels and in part to an electrical generator. The electric generator powers a battery and motor that also provide torque output. In this configuration, torque output can come from either source or both simultaneously. In this configuration the vehicle braking system can even deliver torque to drive the generator to produce charge to the battery.

The desirability of combining an ICE with an electric motor is clear. The combination provides the opportunity to reduce the ICE's fuel consumption and pollutants with no appreciable loss of performance or range of the vehicle. Nevertheless, there remains substantial room for development of ways to optimize these HEV's operational parameters.

One such area of improvement is the HEV's tailpipe and evaporative emission control systems. Tailpipe emissions require very tight control of the Air to Fuel ratio (A/F). Controlling the A/F ratio requires an oxygen sensor to measure the amount of oxygen leaving the engine after combustion. A controller then monitors the oxygen levels and controls the amount of fuel provided by the injectors in an attempt to create an optimal A/F ratio, thereby reducing unwanted emissions.

Controlling the A/F ratio becomes more complex when fuel vapor is considered. Fuel vapor is generated in the fuel system (tank and lines) because of the heat of the fuel when the engine is running at its stabilized operating temperature. If not managed properly, the vapor can build, causing the fuel vapor pressure to increase to the point where the vapor can leak out of the fuel system into the atmosphere as unwanted evaporative emissions. Thus, a charcoal canister is typically installed between the fuel tank and the engine to collect the fuel vapor. Over time, the canister becomes full and must be emptied or purged. In order to purge, a vapor management valve (VMV) is opened in a controlled manner by a VMV controller, thereby allowing the fuel vapor into the intake manifold, as long as there is sufficient vacuum present inside the manifold. During the purging process, the A/F controller maintains the optimum A/F ratio (and thus compensates for the additional fuel vapor entering the cylinders) by adjusting the fuel amount delivered by the injectors. Then, the VMV controller determines when the canister is empty and closes the VMV. Specifically, the VMV controller determines the canister's condition by estimating how much fuel vapor is being drawn into the intake manifold and cylinders. The amount that the A/F controller must correct the fuel delivery through the fuel injectors when the purging process is occurring reflects how much fuel vapor is coming from the vapor canister and causing the A/F disturbance.

Although it is desirable to purge the canister as quickly as possible, the rate of purging must be controlled. If the purge valve opens too quickly, especially if the intake manifold is in a high vacuum condition, the A/F controller may not be able to compensate fast enough for the incoming fuel vapor. This, in turn, can cause the A/F ratio to become too lean and causes poor engine combustion. In a conventional vehicle, if the A/F is too lean, the engine could stall. Thus, in conventional vehicles (and perhaps some HEV configurations), even though the vapor canister can be purged faster if the VMV is opened quickly and if higher vacuum conditions are present in the intake manifold, the risk exists that the engine may stall.

HEVs present additional purge problems. First, the engine is not always running, particularly during idle conditions (when the vehicle is not in motion). The canister can still store vapor, but it is not possible to purge the canister if the engine is not running.

Second, some HEVs run the engine at near wide-open throttle conditions (when the engine is running) because it is more fuel-efficient. However, little or no vacuum is available to draw the vapor into the intake manifold when the VMV is opened. This, in turn, makes it very difficult to purge the vapor canister.

Finally, most engine control systems implement an adaptive fuel strategy that "learns" or "adapts" the long term fuel shifts in the fuel delivery system caused by variation in fuel system components (injectors and mass air flow sensor). A typical engine control system does not allow the purging process to occur while the adaptive fuel shifts are learned because the purging process introduces A/F ratio shifts that should not be attributed to the fuel delivery system but rather to purge vapor. Thus, for the reduced amount of time that the engine is running during an HEV drive cycle, the adaptive fuel and purge strategies are competing for time to accomplish their objective.

The aforementioned issues make it difficult to purge the vapor canister often enough during a given HEV drive cycle. This increases the risk that fuel vapors will be released into the environment, which is not consistent with current emission goals and standards. Therefore, it is desirable to develop a method of purging the canister of an HEV to minimize the release of fuel vapor to the environment.

SUMMARY OF THE INVENTION

The present invention provides a method and system for purging a vapor canister in an HEV. Even though this invention is for an HEV, it uses a conventional-type purge control strategy that runs normally when the engine is "on" and conventional purging conditions are met (such as the adaptive fuel strategy is not running). This strategy includes the vehicle idle modes encountered in an HEV drive cycle where the engine is required to be "on" for reasons other than purging the vapor canister. The reasons include but are not limited to battery charging and running the air conditioner if mechanically driven by the engine front end accessory drive belt, etc.

When the engine is running, it is not always at an optimal point for purging (low vacuum or adaptive fuel strategy is running). Further, since most vehicle idle modes have the engine "off", the vapor canister status and purge must be monitored at appropriate times to insure efficiency and emissions goals are met. The best opportunity for doing this is when the vehicle is at idle.

The present invention forces the engine to remain (or turn) on at vehicle idle conditions to purge the vapor canister if required by certain canister conditions. These canister conditions can include, but are not limited to, fuel tank pressure and the time lapse since the last purge cycle exceeding a calibratable threshold. Once it is determined that purging is required, the engine is turned on (if not already on) and is commanded to operate at lower throttle positions so that more vacuum is available in the intake manifold to draw in the fuel vapor. This part of the invention can only be accomplished if an electronic throttle controller is used with the engine.

In some HEV configurations where the engine speed is controlled by an electric motor (such as a PSHEV or "powersplit"), these very high intake manifold vacuum conditions can be forced via throttle control without risking an engine stall. If the A/F ratio were too lean because the A/F controller cannot accommodate the incoming fuel vapor, the engine would not stall because of poor combustion. The electric motor controls the engine speed. The controller then maintains the engine running in this high vacuum state until the vapor canister is empty so that the purging process can be stopped and the engine turned "off" again during vehicle idle conditions.

BRIEF DESCRIPTION OF THE DRAWINGS

FIG. 3 is a flow chart illustrating the HEV purging process.

DETAILED DESCRIPTION OF THE PREFERRED EMBODIMENTS

Figure 1:
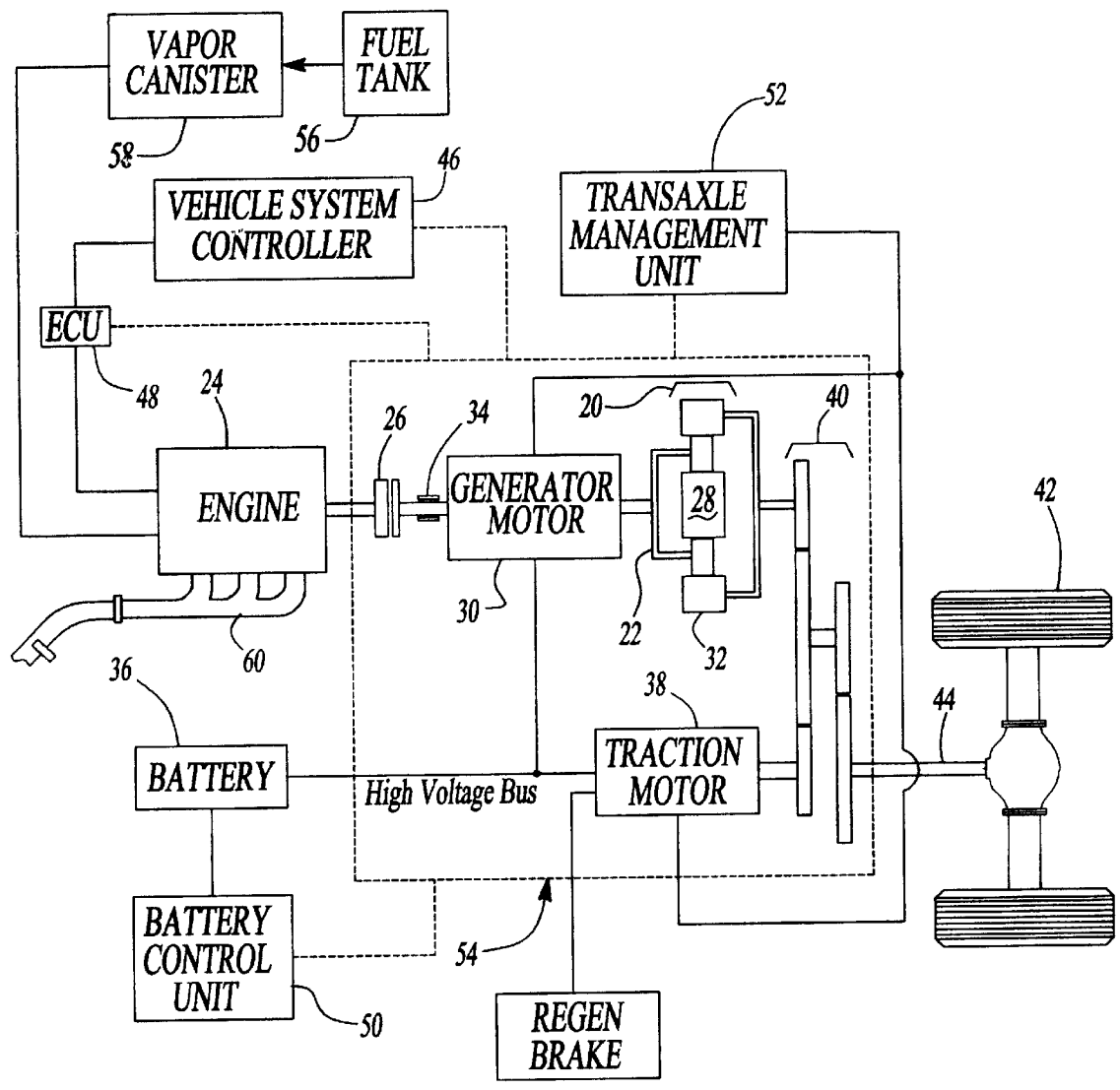
FIG. 1 illustrates the configuration of a basic powersplit Hybrid Electrical Vehicle.

The present invention relates to Electric Vehicles and, more particularly, Hybrid Electric Vehicles (HEVs). FIG. 1 demonstrates just one possible configuration, specifically a Parallel/Series Hybrid Electric Vehicle (powersplit) configuration.

In a basic powersplit HEV, a Planetary Gear Set 20 mechanically couples a Carrier Gear 22 to an Engine 24 via a One Way Clutch 26. The Planetary Gear Set 20 also mechanically couples a Sun Gear 28 to a Generator Motor 30 and a Ring (output) Gear 32. The Generator Motor 30 also mechanically links to a Generator Brake 34 and is electrically linked to a Battery 36. A Traction Motor 38 is mechanically coupled to the Ring Gear 32 of the Planetary Gear Set 20 via a Second Gear Set 40 and is electrically linked to the Battery 36. The Ring Gear 32 of the Planetary Gear Set 20 and the Traction Motor 38 are mechanically coupled to Drive Wheels 42 via an Output Shaft 44.

The Planetary Gear Set 20, splits the Engine 24 output energy into a series path from the Engine 24 to the Generator Motor 30 and a parallel path from the Engine 24 to the Drive Wheels 42. Engine 24 speed can be controlled by varying the split to the series path while maintaining the mechanical connection through the parallel path. The Traction Motor 38 augments the Engine 24 power to the Drive Wheels 42 on the parallel path through the Second Gear Set 40. The Traction Motor 38 also provides the opportunity to use energy directly from the series path, essentially running off power created by the Generator Motor 30. This reduces losses associated with converting energy into and out of chemical energy in the Battery 36 and allowing all Engine 24 energy, minus conversion losses, to reach the Drive Wheels 42.

A Vehicle System Controller (VSC) 46 controls many components in this HEV configuration by connecting to each component's controller. The Engine Control Unit (ECU) 48 connects to the Engine 24 via a hardwire interface. The ECU 48 and VSC 46 can be based in the same unit, but are actually separate controllers. The HEV purge control, which is the subject of this invention, can be handled in either the VSC 46 or ECU 48. The VSC 46 communicates with the ECU 48, as well as a Battery Control Unit (BCU) 50 and a Transaxle Management Unit (TMU) 52 through a communication network, such as a Controller Area Network (CAN) 54. The BCU 50 connects to the Battery 36 via a hardwire interface. The TMU 52 controls the Generator Motor 30 and Traction Motor 38 via a hardwire interface.

Figure 2:
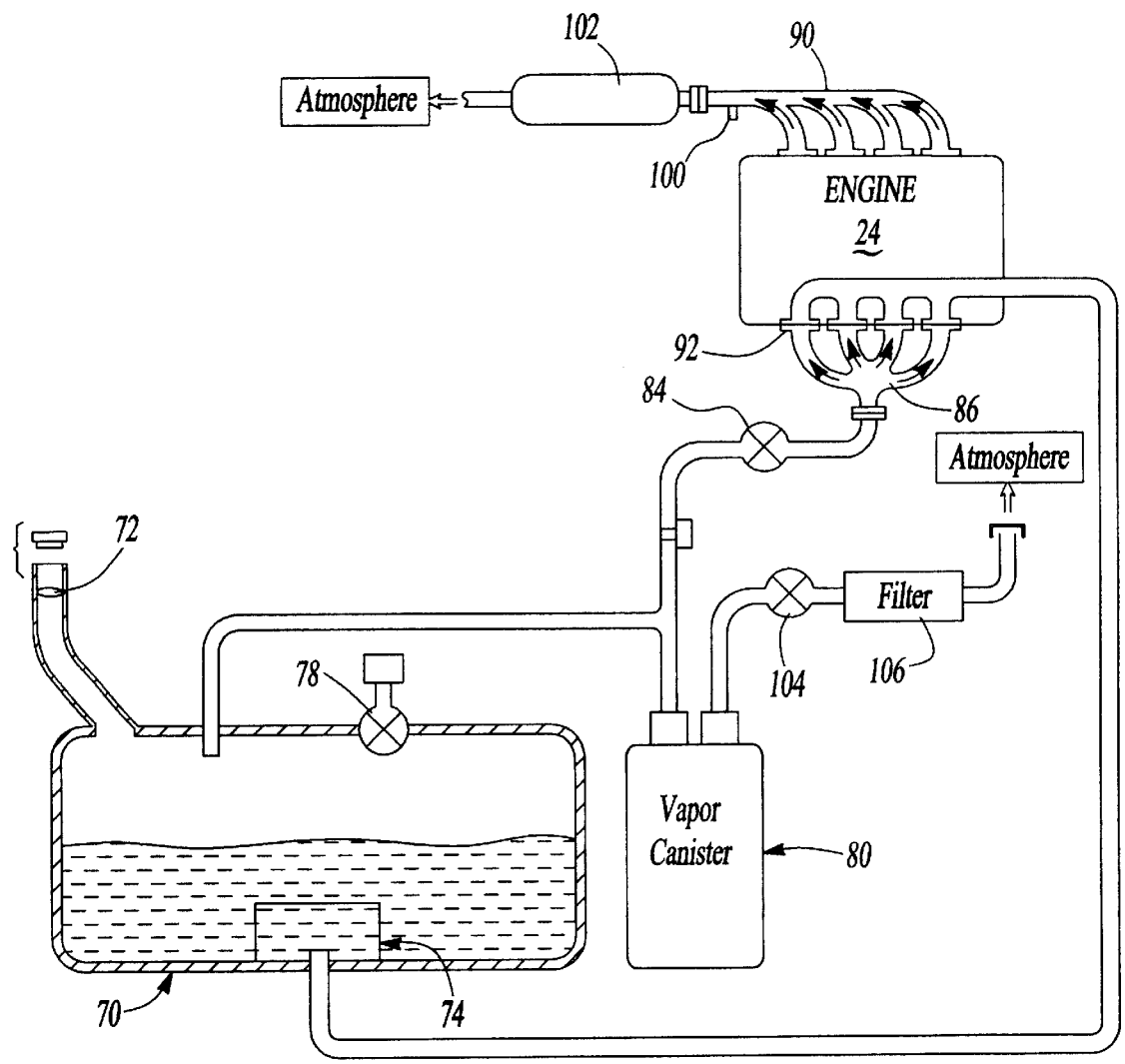
FIG. 2 illustrates the general layout of a fuel system and an exhaust system.

FIG. 2 illustrates the general layout of a typical fuel system, exhaust system, for the Engine 24. A Fuel Tank 70 supplies the fuel to Fuel Injectors 92 via a Conventional Fuel Pump 74. A conventional Vacuum Relief Valve 72 is provided on the Fuel Tank 70 cap for equalizing pressure applied to the Fuel Tank 70. The Fuel Tank 70 further includes a Fuel Tank Pressure Transducer 78 that senses fuel tank vapor pressure and sends the signal to the ECU 48.

A fuel Vapor Canister 80 is provided for trapping, storing, and subsequently releasing fuel vapor dispelled from the Fuel Tank 70 for combustion into the Engine 24. An Electric Vapor Management Valve ("EVMV") 84, when closed, prevents fuel vapor from escaping into the Engine 24 and diverts it to the Vapor Canister 80. When opened, the EVMV 84 allows fuel vapor to flow into the Intake Manifold 86 of Engine 24. The Vapor Canister 80 is connected to the atmosphere through a Canister Vent Valve 104. A Filter 106 may be provided between the Canister Vent Valve 104 and the atmosphere for filtering the air pulled into the vapor Canister 80. The Canister Vent Valve 104 is a normally open solenoid valve controlled by the ECU 48.

After combustion, exhaust enters an Exhaust Manifold 90 where an Oxygen Sensor 100 measures the oxygen level in the exhaust to determine the A/F ratio. The exhaust then proceeds to a Catalytic Converter 102 and finally to the atmosphere.

In an HEV, the purging process can only be invoked when the Engine 24 is running. However, when the Engine 24 is running, the conditions may not allow purging. The HEV Engine 24 typically runs at or near wide-open throttle to maximize fuel efficiency. This is not suitable for purging. In addition, an adaptive fuel routine typically needs to compete with the purging routine for Engine 24 running time to accomplish its tasks.

During the modes when the HEV Engine 24 is not running (the Engine 24 is frequently shut down for fuel efficiency purposes), the purging process also can not be undertaken even though fuel vapor can still collect in the Vapor Canister 80. Therefore, it is necessary to determine when the Engine 24 should be forced "on" when it would otherwise normally be "off" (particularly at vehicle idle conditions) so that the purging process can be executed.

The present invention provides a method for purging the Vapor Canister 80 of an HEV, in particular by commanding the Engine 24 to come (or stay) "on" during vehicle idle conditions so that the purging process can be executed, and by controlling the Engine 24 throttle plate (not shown) while purging to provide a high Intake Manifold 86 vacuum, thereby drawing the fuel vapor in very rapidly.

To determine whether this HEV purge routine at idle is necessary, the controller (either VSC 46 or ECU 48) runs through a strategy that is illustrated in FIG. 3. (It should be noted this invention is a component part to the patent application for Engine Idle Arbitration, Invention Disclosure #200-0318.

At Step 200 the vehicle being "keyed on" to start a given HEV drive cycle. At this step, the controller initializes two parameters used in the HEV purge routine. The first is PURGE_1 1ST_PASS, which is initialized to 0, and is used to force the Engine 24 "on" at the first vehicle idle condition encountered and is used to make sure the Vapor Canister 80 has a chance to be cleaned for the given drive cycle, even if the cycle is short in duration. The second parameter is LAST_PRG_TMR, which is initialized to 0, and is then allowed to begin counting. This is used to indicate how long it has been since the purging process was last completed.

The strategy proceeds next to Step 202 where the controller (either VSC 46 or EMU 48) determines if vehicle idle conditions are met. These conditions can include, but are not limited to, determinations of whether the accelerator position (PEDAL_POSITION) is less than a calibratable threshold and if the vehicle speed (VEHICLE_SPEED) is less than a calibratable threshold. If these conditions are not met, the vehicle will remain in its current driving mode, regardless of whether the Engine 24 is currently "on" or "off". If the idle conditions are satisfied, then the logic proceeds to Step 206 and begins an HEV purge routine 206. The first step in the HEV purge routine 206 is to proceed to Step 208, which checks to see if PURGE_1 1ST_PASS=0. If PURGE_1 1ST_PASS=0, the purging process is attempted at least once for the given drive cycle. If yes, the routine proceeds directly to Step 214 where the Engine 24 is started via the command ENGINE—MODE=1 and then to Step 216 where the conventional purge strategy is invoked via the command PURGE_ENABLE=1. The conventional purge strategy works by opening the EVMV 84 between the Vapor Canister 80 and the Intake Manifold 86, thereby allowing fuel vapor to enter the Engine 24 to be combusted.

If PURGE_1ST_PASS=1, then the strategy proceeds to Step 210 where a check is made to see if TANK_PRESSURE exceeds a calibratable threshold. If yes, the logic goes to Step 214 to start the Engine 24 and Step 216 to enable the conventional purge strategy, as described previously.

If TANK_PRESSURE does not exceed the calibratable threshold, the logic moves to Step 212 where LAST_PRG_TMR is compared to a calibratable threshold. If LAST_PRG_TMR exceeds the threshold, then the strategy proceeds directly to Step 214 to start the Engine 24 and Step 216 to enable the conventional purge strategy, as described previously.

If LAST_PRG_TMR does not exceed the calibratable threshold, then the strategy jumps directly to a last step, Step 226, where the HEV purge routine ends and the Engine 24 is allowed to shut off for the given vehicle idle condition (via ENGINE_MODE=0).

Once the Engine 24 has started at Step 214 and the conventional purge strategy has invoked at Step 216, the logic proceeds to Step 218 where the Engine 24 throttle plate is commanded to a calibratable position intended to produce high vacuum conditions in the Intake Manifold 86. Higher vacuum allows for faster purging because the fuel vapors will enter the manifold quickly.

Once the purging process has started from Steps 216 and 218, the logic determines at Step 220 the condition of the Vapor Canister 80. The condition is determined by using conventional methods, such as using feedback from the oxygen sensor, to determine how far the A/F controller has shifted due to the introduction of the Fuel Tank 70 vapors into the Intake Manifold 86. This can then be used to infer the weight or mass of fuel vapor remaining in the Vapor Canister 80. When this determination is accomplished, Step 222 determines whether the Vapor Canister 80 is sufficiently empty of fuel vapors. If yes, the logic proceeds to Step 226 where the HEV purge routine ends and the Engine 24 is allowed to shut off for the given vehicle idle condition (via ENGINE_MODE=0). If the Vapor Canister 80 is not considered to be empty, then the strategy continues the purging process (Step 224) and repeats the Vapor Canister 80 empty check at Steps 220 and 222 until the Vapor Canister 80 is clean.

At Step 226, where the HEV purge routine ends and the Engine 24 is allowed to shut off for the given vehicle idle condition (via ENGINE_MODE=0), the LAST_PRG_TMR is reset to 0 and then incremented once again until the next purging sequence occurs.

We claim:

1. A method of purging a vapor canister in a hybrid electric vehicle during vehicle idle conditions comprising the steps of:

determining if vehicle idle conditions are met;
determining if a purging process has been executed for a recent drive cycle;
determining fuel tank pressure;
comparing fuel tank pressure to a calibratable pressure threshold;
determining the time since last purge;
comparing time since last purge to a calibratable time threshold;
starting an engine;
purging by opening a valve between the vapor canister and an intake manifold; and
controlling a throttle plate via an electronic throttle controller to increase vacuum in the intake manifold.

2. A system to purge a vapor canister in a hybrid electric vehicle during vehicle idle conditions comprising:

means for determining if vehicle idle conditions are met:
means for determining if a purging process has been executed for a recent drive cycle;

means for determining fuel tank pressure;

means for comparing fuel tank pressure to a calibratable pressure threshold;

means for determining time since last purge;

means for comparing time since last purge to a calibratable time threshold;

means for starting an engine;

means for opening a valve between the vapor canister and an intake manifold to start the purge process; and means for controlling a throttle plate via an electronic throttle controller to increase vacuum in the intake manifold.

3. The method of claim 1, further comprising:

determining a vapor canister condition.

4. The method of claim 3, wherein determining a vapor canister condition comprises:

determining how far an air/fuel ratio controller has shifted.

5. The method of claim 3, wherein determining a vapor canister condition comprises:

determining the mass of remaining vapor in the vapor canister.

6. The method of claim 1, further comprising:

stopping the engine.

7. The method of claim 1, wherein controlling a throttle plate via an electronic throttle controller to increase vacuum in the intake manifold comprises:

controlling the throttle plate to a calibratable position.

8. The system according to claim 2, further comprising a purge control strategy embodied in a vehicle system controller.

9. The system according to claim 2, further comprising a purge control strategy embodied in an engine control unit.

10. The system according to claim 2, wherein the means for determining fuel tank pressure comprises a fuel tank pressure transducer electronically connected to an engine control unit.

11. The system according to claim 2, wherein the means for opening a valve between the vapor canister and an intake manifold to start the purge process comprises an electric vapor management valve electronically connected to an engine control unit.

12. The system according to claim 2, further comprising:

means for determining a vapor canister condition.

13. The system according to claim 12, wherein the means for determining a vapor canister condition comprises:

means for determining how far an air/fuel ratio controller has shifted.

14. The system according to claim 12, wherein the means for determining a vapor canister condition comprises:

means for determining the mass of remaining vapor in the vapor canister.

15. The system according to claim 2, further comprising;

means for stopping the engine.

16. The system according to claim 2, wherein the means for controlling a throttle plate via an electronic throttle controller to increase vacuum in the intake manifold comprises:

means for controlling the throttle plate to a calibratable position.

17. A system for purging a vapor canister in a hybrid electric vehicle that includes an engine and a starter for said engine, comprising:

an electronic throttle controller and a throttle plate in an intake manifold of said engine;

a controller connected by means of a network to said electronic throttle controller;

a strategy in said controller for determining if a purging process has been executed for a recent drive cycle including a clock for determining whether a preselected minimum time since last purge has elapsed;

a pressure transducer operatively connected to the controller for determining fuel tank pressure;

a controller strategy for comparing fuel tank pressure against a preselected pressure threshold;

a valve controlled by said controller between the vapor canister and an intake manifold to start the purge process; and a controller strategy for causing said electronic throttle controller to control said throttle plate to increase vacuum in said intake manifold of said engine.

18. The system according to claim 17, further comprising a controller strategy to determine a vapor canister condition.

19. The system according to claim 18, wherein the controller strategy to determine a vapor canister condition comprises a controller strategy to determine how far an air/fuel ratio controller has shifted.

20. The system according to claim 18, wherein the controller strategy to determine a vapor canister condition comprises a controller strategy to determine the mass of remaining vapor in the vapor canister.

21. The system according to claim 17, wherein the controller strategy for causing said electronic throttle controller to control said throttle plate to increase vacuum in said intake manifold of said engine controls said electronic throttle plate to a calibratable position.

* * * * *